(12) United States Patent
Maeda et al.

(10) Patent No.: US 7,170,693 B2
(45) Date of Patent: Jan. 30, 2007

(54) OBJECTIVE LENS, AND OPTICAL PICKUP DEVICE USING THE OBJECTIVE LENS

(75) Inventors: Fumisada Maeda, Tokyo (JP); Shinichi Nagashima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/363,265

(22) PCT Filed: Jul. 3, 2002

(86) PCT No.: PCT/JP02/06751

§ 371 (c)(1),
(2), (4) Date: Mar. 10, 2003

(87) PCT Pub. No.: WO03/007044

PCT Pub. Date: Jan. 23, 2003

(65) Prior Publication Data

US 2003/0179469 A1   Sep. 25, 2003

(30) Foreign Application Priority Data

Jul. 9, 2001   (JP) .............................. 2001-208497

(51) Int. Cl.
*G02B 7/02* (2006.01)

(52) U.S. Cl. ...................... 359/811; 359/819; 359/813; 359/823

(58) Field of Classification Search ................ 359/811, 359/819, 813, 821, 822, 823, 661, 719, 667; 369/112.24, 112.2, 112.23
See application file for complete search history.

(56) References Cited

U.S. PATENT DOCUMENTS

| 5,764,613 | A |   | 6/1998 | Yamamoto et al. ......... 369/112 |
| 6,115,347 | A | * | 9/2000 | Ichimura et al. ........ 369/112.24 |
| 6,131,195 | A | * | 10/2000 | Foreman .......................... 2/22 |
| 6,134,195 | A | * | 10/2000 | Kawamura ............... 369/44.23 |
| 6,490,100 | B1 | * | 12/2002 | Sasano et al. .............. 359/719 |
| 6,552,858 | B2 | * | 4/2003 | Uno et al. ................... 359/717 |
| 6,674,696 | B1 | * | 1/2004 | Ichimura et al. ......... 369/44.35 |
| 2001/0014059 | A1 | * | 8/2001 | Fujimaki et al. ......... 369/44.14 |
| 2001/0038499 | A1 | * | 11/2001 | Baartman et al. ........... 359/821 |

FOREIGN PATENT DOCUMENTS

| DE | 10015953 A1 | 10/2000 |
| EP | 840156 | 5/1998 |
| EP | 0863502 A2 | 9/1998 |
| EP | 0863502 A3 | 9/1998 |
| JP | 06059172 | 3/1994 |
| JP | 10-333007 | 12/1998 |
| JP | 2000-347088 | 12/2000 |
| JP | 2002-196208 | 7/2002 |
| JP | 2002-221649 | 8/2002 |

* cited by examiner

*Primary Examiner*—Alicia M Harrington
*Assistant Examiner*—Brandi Thomas
(74) *Attorney, Agent, or Firm*—Oblon, Spivak, McClelland, Maier & Neustadt, P.C.

(57) ABSTRACT

An objective lens unit used for an optical pickup device is made up of a plurality of lenses and has a numerical aperture (NA) not less than 0.7. The lenses (1) and (2) are secured within a cylindrically-shaped lens holder (3). The position of the lens(es) (2) other than one of the lenses secured within the lens holder is set with the position of the one lens (1) as reference.

5 Claims, 13 Drawing Sheets

OBJECTIVE LENS, AND OPTICAL PICKUP DEVICE USING THE OBJECTIVE LENS

TECHNICAL FIELD

This invention relates to an objective lens unit made up by plural lenses and which may be used with advantage for an optical pickup device adapted for writing or reading out information signals for an optical recording medium, a method for manufacturing the objective lens unit, an optical pickup device employing this objective lens unit, and to a recording and/or reproducing apparatus employing this objective lens unit.

BACKGROUND ART

Up to now, an optical recording medium, exemplified by an optical disc, has been used as a recording medium for information signals. An optical pickup device is used for writing or reading out information signals on or from an optical recording medium. The optical pickup device includes a semiconductor laser, as a light source for radiating a light beam to be illuminated on the optical recording medium, and an objective lens unit for condensing the light beam radiated from the semiconductor laser for illuminating the light beam to a signal recording surface of the optical recording medium.

In the optical pickup device, the spot diameter of the light beam illuminated on the signal recording surface of the optical recording medium may be reduced to realize high recording density of the information signals recorded on the optical recording medium to enable readout of the information signals recorded to high density.

For reducing the spot diameter of the light beam illuminated on the signal recording surface of the optical recording medium, it is effective to shorten the wavelength of the light beam radiated from the light source and to enlarge the numerical aperture (NA) of the objective lens condensing the light beam.

The present Assignee has proposed an objective lens unit of a larger numerical aperture (NA) in JP Laying-Open Patent Publication H-8-315404 and JP Laying-Open Patent Publication H-10-123410. The objective lens unit disclosed in this Patent publication is composed of a double-lens set made up of two lenses, and has a numerical aperture not less than 0.7.

Up to now, a lens composed of one lens set made up by a single lens, or so-called a "single lens", has been used extensively as an objective lens unit used in an optical pickup device. The single lens can be prepared by so-called glass mold forming. A lens of high performance can be formed with high reproducibility by fabricating the metal die to high precision and by high precision temperature management during casting. If the lens is to have a larger value of the numerical aperture (NA) of for example 0.7 or larger, a larger refractive power is required of the lens, such that the first surface of the light beam incident side of the lens needs to be a non-spherical surface with a larger curvature. In light of for example mold release properties, it is extremely difficult to form the objective lens unit having a non-spherical surface of a large curvature using a metal die. Moreover, with an objective lens unit having a non-spherical surface of a larger curvature and a larger numerical aperture (NA), the light beam radiated from the light source cannot be condensed accurately on the signal recording surface even on occurrence of perturbations resulting from the slightest tilt relative to the optical axis.

With the objective lens unit comprised of a double-lens set composed of two lenses, as disclosed in the above Publications, the refractive power can be dispersed to two lenses to moderate the curvature of the respective lens surfaces as well as to decrease the non-spherical surface coefficients. Consequently, the objective lens unit can be formed to a desired machining accuracy, using a metal die, so that it becomes possible to suppress deterioration of the optical performance caused by for example the tilt of the lens relative to the optical axis.

With the objective lens unit of a double-lens set composed of two lenses, the respective lenses can be molded with a metal die to prevent its optical characteristics from being deteriorated. However, the respective lenses need to be registered to each other highly accurately, i.e., it is necessary to get the optical axes of the respective lenses of the objective lens unit registered with each other high accurately without producing eccentricity in the respective lenses and to maintain the distance and parallelism between the respective lenses highly accurately.

For producing an objective lens unit of a double-lens set composed of two lenses, there are such a method consisting in causing the laser light to fall on the objective lenses, put together, and in forming an interferometer by the respective lenses to adjust the relative position thereof, and such a method consisting in causing the laser light to be transmitted through the objective lenses put together and in observing the near-field pattern of the laser light to make the adjustment. With these methods, the phenomena observed are not changed independently for respective adjustment parameters, such that adjustment is extremely time-consuming due to many looped procedures required for achieving the final performance.

In assembling, there is such a method which consists in providing a gap between the lens holder 3 and the lens and in adjusting the lens position within the gap range. With this method, an adhesive, such as a UV curable resin, needs to be charged into the gap following the adjustment and cured in situ to secure the lens to the lens holder. The lens secured in position in this manner in the lens holder with an adhesive is likely to undergo misregistration due to environmental changes, such as increasing temperature or humidity.

In order to overcome the problems caused by an adhesive, it has been proposed to set the tilt of the lens and its location along the direction of the optical axis depending on the machining accuracy of the lens holder. That is, a step is formed within the lens holder and the outer rim of the lens is abutted against the step to set the tilt of the lens and its location along the optical axis. If, in this structure, the step is formed high accurately, the lens position can be set similarly accurately.

In the case of, for example, an objective lens unit composed of a double-lens set made up by two lenses, with an effective diameter of 3 mm, it is necessary to maintain parallelism between the two lenses on the order of 0.1 deg. For maintaining this accuracy, it is necessary to maintain the error along the optical axis of the surface of the outer lens rim carried by the step within the lens holder to a value on the order of 1 μm. It is however extremely difficult to have the two lenses mounted within the lens holder as this high degree of accuracy is maintained. Additionally, depending on the mounting environment, fine dust and dirt on the order of 1 μm tend to be intruded into a space between the step within the lens holder and the lens to render it difficult to maintain parallelism between the two lenses.

DISCLOSURE OF THE INVENTION

It is therefore an object of the present invention to provide a novel objective lens unit which may be exempt from the above-mentioned drawback of the objective lens unit of a double-lens set composed of two lenses, a method for producing the objective lens unit, an optical pickup device employing this objective lens unit, and a recording and/or reproducing apparatus employing the objective lens unit.

It is another object of the present invention to provide an objective lens unit, which is made up by plural lenses, each having a numerical aperture not less than 0.7, and in which the relative positions of the respective lenses are adjusted to high precision, a method for producing the objective lens unit, and an optical pickup device as well as a recording and/or reproducing apparatus employing this objective lens unit.

The present invention provides an objective lens unit made up of a plurality of lenses, each having a numerical aperture not less than 0.7, wherein the lenses are secured within a cylindrically-shaped lens holder, and wherein the position of a lens(es) other than one of the lenses is secured within the lens holder as the position of the other lens(es) is set with the position of the one lens as reference.

The present invention also provides a method for the preparation of an objective lens unit, from a plurality of lenses, with a numerical aperture not less than 0.7, in which the method includes mounting and securing one lens within a cylindrically-shaped lens holder formed of a synthetic resin material, positioning other lens(es) with the one lens as reference, and securing the other lens(es) to the lens holder for relatively positioning the respective lenses.

The present invention also provides an optical pickup device including a light source, an objective lens unit for condensing and illuminating a light beam radiated from the light source to a signal recording surface of an optical recording medium, and a photodetector for detecting a return beam of the light beam reflected back from the signal recording surface. The objective lens unit is made up of a plurality of lenses each having a numerical aperture not less than 0.7. The relative positions of the lenses are set by positioning and securing the lenses within a cylindrically-shaped lens holder, with the position of a lens(es) other than one of the lenses secured within the lens holder being set with the position of the one lens as reference.

The present invention also provides a recording and/or reproducing apparatus including a recording medium holding unit for holding an optical recording medium, and an optical pickup device including a light source and an objective lens unit for condensing and illuminating a light beam radiated from the light source to a signal recording surface of the optical recording medium. The objective lens unit of the optical pickup device is made up of a plurality of lenses each having a numerical aperture not less than 0.7. The relative positions of the lenses are set by positioning and securing the lenses within a cylindrically-shaped lens holder, with the position of a lens(es) other than one of the lenses secured within the lens holder being set with the position of the one lens as reference.

Other objects, features and advantages of the present invention will become more apparent from reading the embodiments of the present invention as shown in the drawings.

BEST MODE FOR CARRYING OUT THE INVENTION

Figure 1:
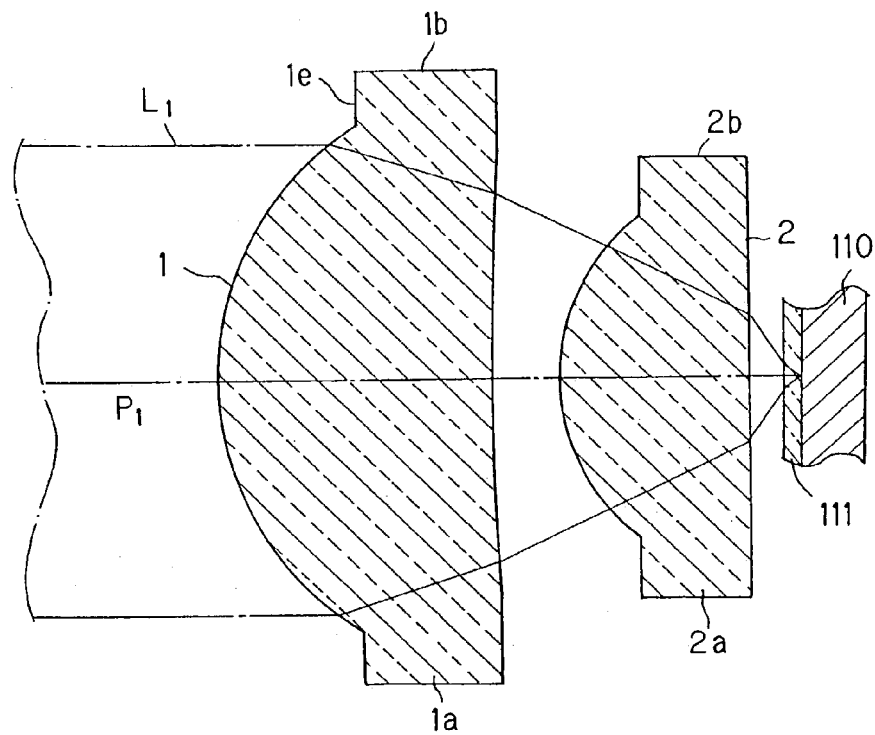
FIG. 1 is a longitudinal cross-sectional view of an objective lens unit according to the present invention.

Referring to the drawings, preferred embodiments of the present invention will be explained in detail.

An objective lens unit of the present invention is made up by plural lenses each having a numerical aperture (NA) of 0.7 or larger. Specifically, the objective lens unit is made up by a double-lens set of two lenses 1, 2, and has a numerical aperture (NA) of 0.85, as shown in FIG. 1.

The objective lens unit of the present invention is built into an optical pickup device having a light source radiating the light beam with a center wavelength of 405 nm. That is, the objective lens unit according to the present invention is mainly used for condensing the light beam having a center wavelength of 405 nm.

Figure 2:
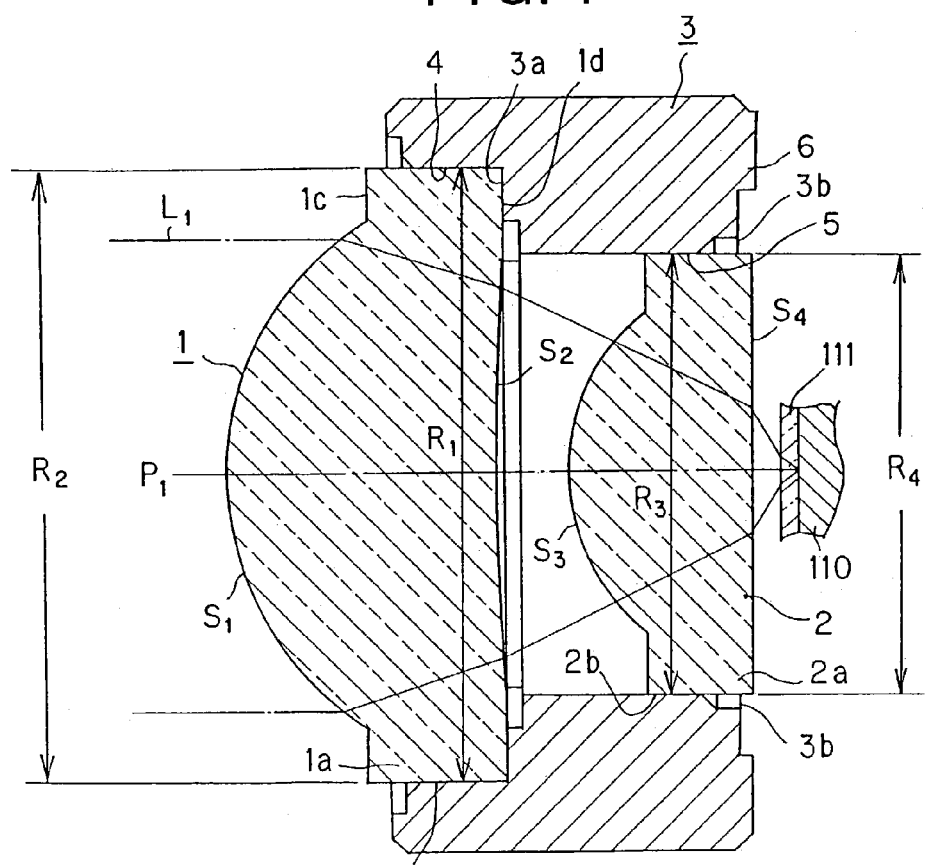
FIG. 2 is a longitudinal cross-sectional view of the objective lens unit built into a lens holder.
Figure 3:
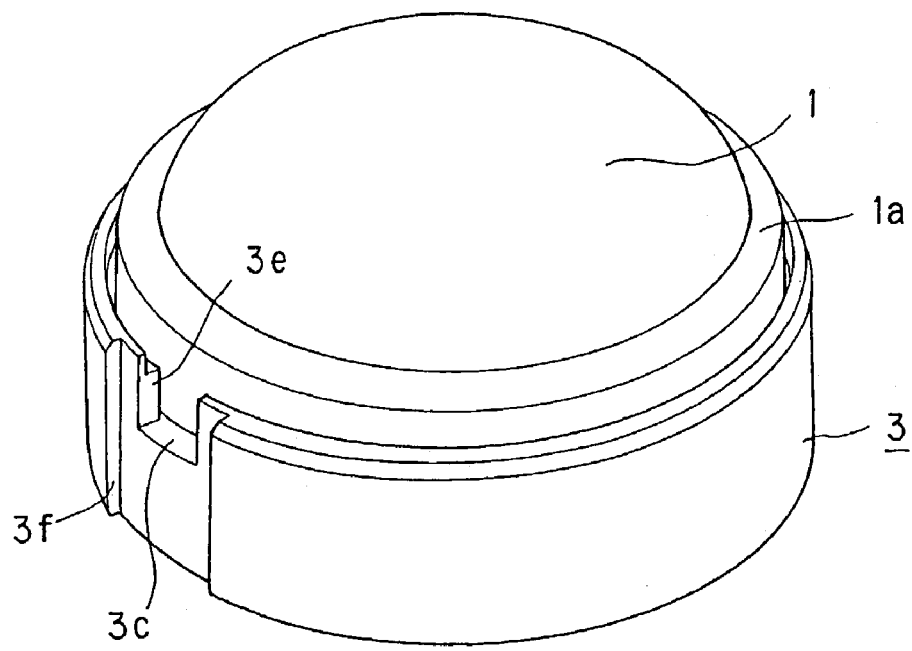
FIG. 3 is a perspective view looking from the first lens.
Figure 4:
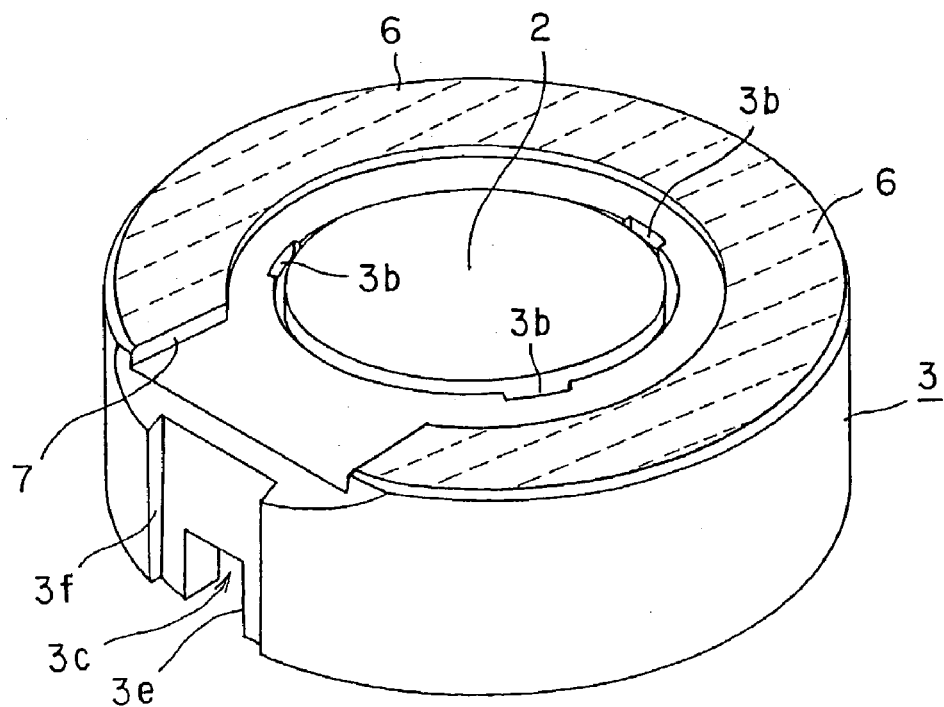
FIG. 4 is a perspective view looking from the second lens.

In the following explanation, it is assumed that the objective lens unit has an effective diameter of 3 mm. Specifically, the manufacturing method for the objective lens unit of the present invention is the method for assembling an objective lens unit. An objective lens unit according to the present invention is made up by first and second lenses 1, 2 and a lens holder 3 for holding the lenses 1, 2, as shown in FIGS. 2, 3 and 4.

The first and second lenses 1, 2 are formed of a vitreous material, and are prepared by so-called glass mold casting of forming a vitreous material using a metal die. The shape of the lens surfaces of the lenses 1, 2, formed as non-spherical or spherical surfaces, position relationships between the lens surfaces and outer rims 1*a*, 2*a* and so forth depend on the machining accuracy of the metal dies for molding, and on the casting conditions.

The lens holder 3 is formed to approximately a cylindrical shape by injection molding of epoxy resin, using silica (silicon dioxide) as a filler, as shown in FIGS. 5 to 10. To this lens holder 3 are fitted the first and second lenses 1, 2. The first and second lenses 1, 2, inserted in position in the lens holder 3, are secured with an adhesive, such as UV curable resin.

Figure 5:
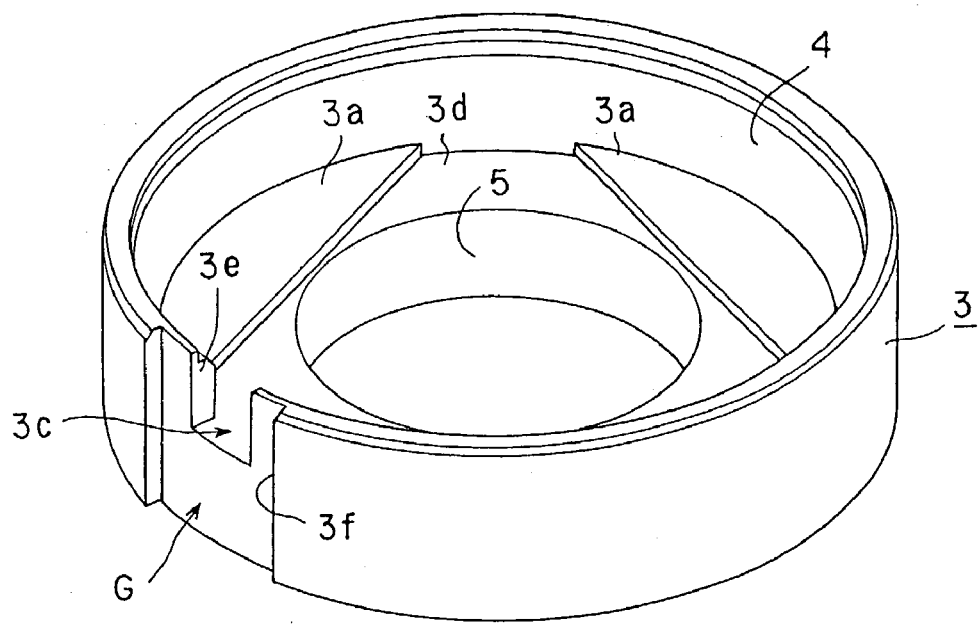
FIG. 5 is a perspective view of a lens holder forming the objective lens unit looking from a first lens fitting portion.
Figure 6:
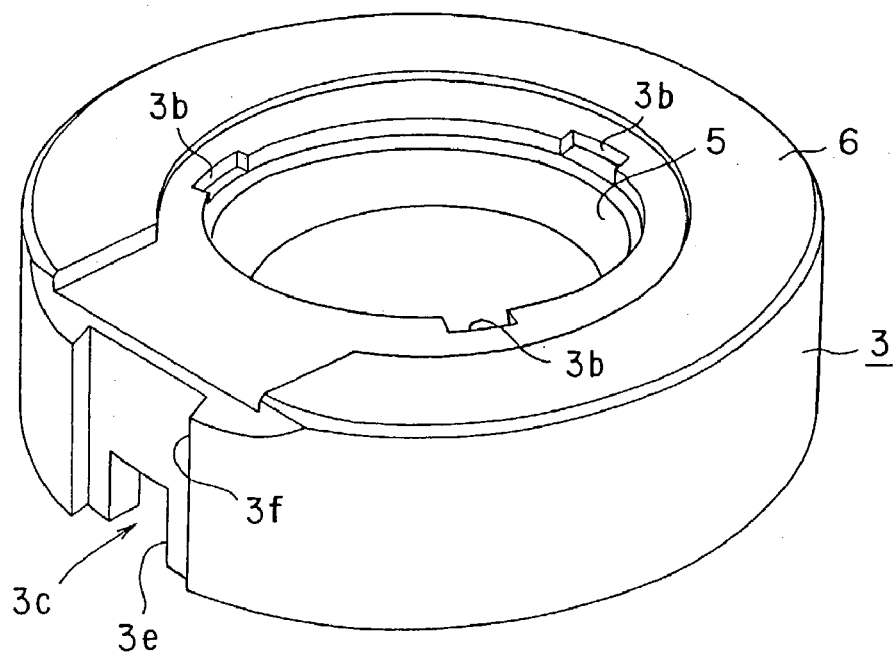
FIG. 6 is a perspective view of the lens holder forming the objective lens unit looking from a second lens fitting portion.

In this objective lens unit, the eccentricity of the lenses 1, 2 relative to the optical axis $P_1$, that is positions of the lenses in bi-axial directions, corresponding to directions within the planar surface perpendicular to the optical axis $P_1$, among the relative positions between the lenses 1, 2, are set by the outer diameters of the outer rims 1*a*, 2*a* of the lenses 1, 2, and by the inner diameter of the lens holder 3. That is, first and second lens fitting portions 4, 5 in which to insert the lenses 1, 2 and which control the eccentricities thereof are formed in inner sides of the lens holder 3, as shown in FIGS. 2 and 5.

Figure 11:
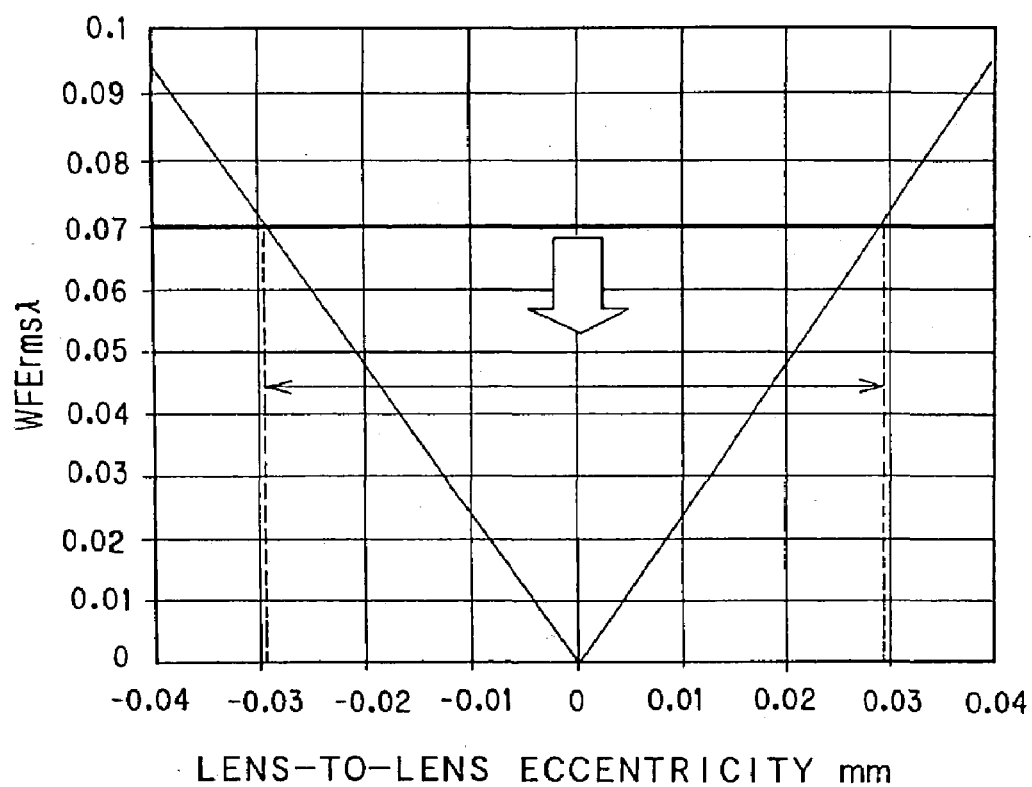
FIG. 11 is a graph showing the relation between the eccentricity between the lenses and the value of the wavefront aberration.
Figure 12:
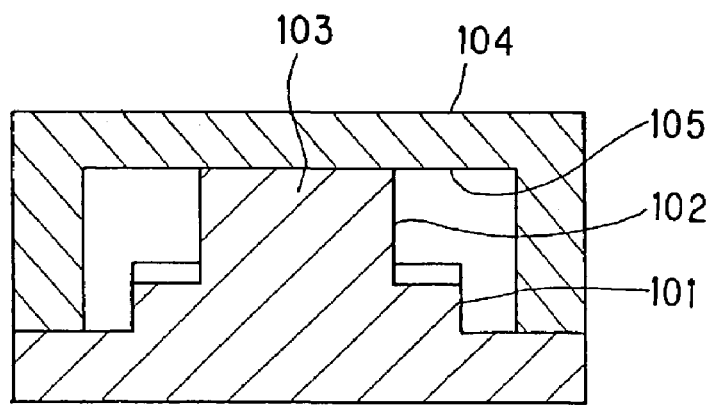
FIG. 12 is a longitudinal cross-sectional view showing a metal die for forming the lens holder.
Figure 13:
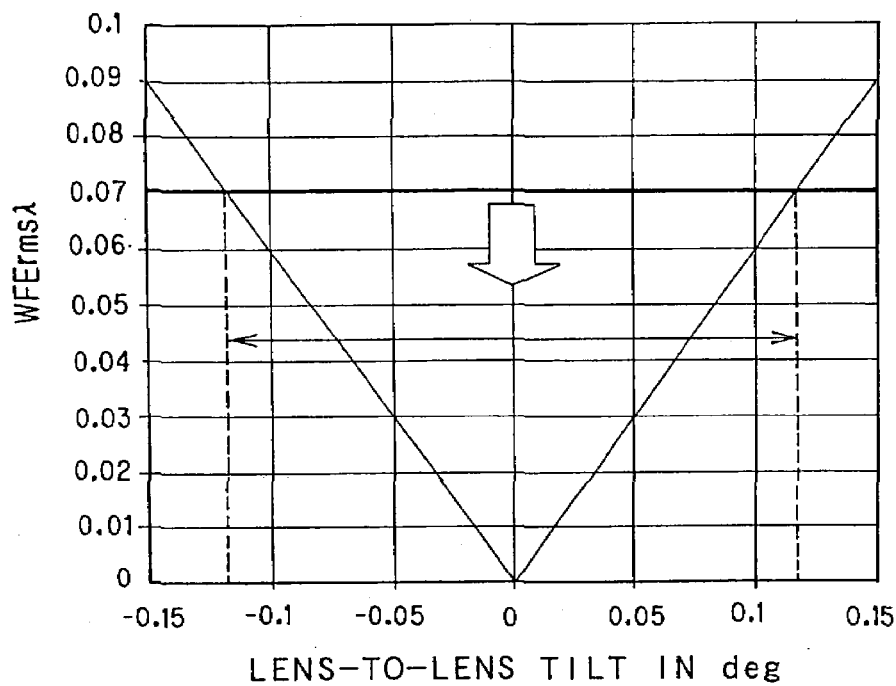
FIG. 13 is a graph showing the parallelism between the lenses and the value of the wavefront aberration.

If, in the objective lens unit formed by combining the first and second lenses 1, 2, relative eccentricities are produced between the lens surfaces of the first and second lenses 1, 2 the aberration is increased to deteriorate the optical performance, as show in FIG. 11.

It is noted that the relative eccentricities between the lens surfaces of the first and second lenses 1, 2 mean position offset in the planar direction perpendicular to the common optical axis of the lenses 1, 2, centered about this optical axis.

If, in an objective lens unit with an effective diameter of 3 mm and the numerical aperture NA of 0.85, the relative eccentricities between the lens surfaces of the first and second lenses 1, 2 exceed ±30 µm, the RMS value of the aberration exceeds the Marshall criteria threshold (wavefront aberration of 0.07 λrms). That is, if, in an objective lens unit, formed by combining the first and second lenses 1, 2, the effective diameter is 3 mm, the numerical aperture NA is 0.85 and the working center wavelength is 405 nm, the lenses 1, 2 need to be secured to the lens holder 3 so that an error range of the coaxial degree of the lens surfaces of the respective lenses 1, 2 relative to the outer diameter of the lens holder 3 will be within 30 µm. The following factors may be surmised to be responsible for these relative eccentricities between the lens surfaces of the first and second lenses 1 and 2:

(1) The error in the coaxial degree between the outer peripheral surfaces of the outer rims 1*a*, 2*a* of the lenses 1, 2 and the lens surfaces;

(2) the error in the coaxial degree between the lens fitting portions 4, 5 of the lens holder 3; and (3) the clearance between the lens fitting portions 4, 5 and the outer rims 1*a*, 2*a* of the lenses 1, 2.

Since the accumulation of these three factors determines the amount of the eccentricities of the lens surfaces of the respective lenses 1, 2, it is essential that at least the coaxial degree of the lens surfaces of the respective lenses 1, 2 relative to the outer diameter of the lens holder 3 be within 30 µm.

That is, since the outer peripheral surfaces 1*b*, 2*b* of the outer rims 1*a*, 2*a* of the lenses 1, 2 are formed as one with the lens surfaces by glass mold casting employing a metal die, the coaxial degree between the outer peripheral surfaces 1*b*, 2*b* of the outer rims 1*a*, 2*a* and the lens surfaces depends on the machining accuracy of the metal die for casting and on the casting conditions. When the effective diameter of the objective lens is 3 mm, the outer peripheral surfaces 1*b*, 2*b* of the outer rims 1*a*, 2*a* and the lens surfaces are formed so as to have a coaxial degree with an error range within 30 µm.

Figure 9:
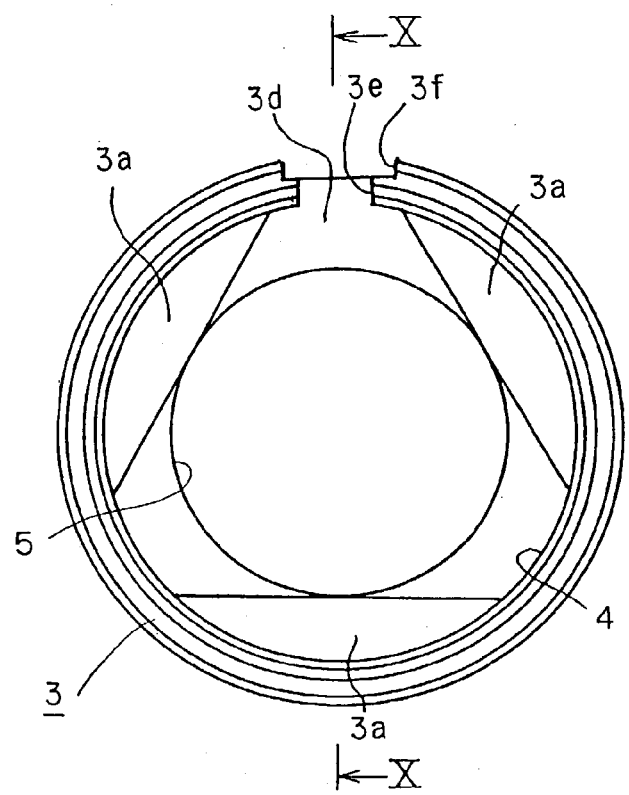
FIG. 9 is a bottom plan view showing the lens holder forming the objective lens unit of the present invention.
Figure 10:
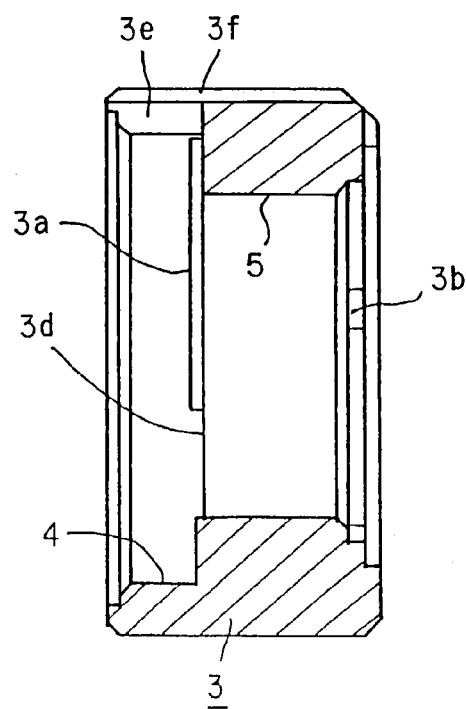
FIG. 10 is a cross-sectional view taken along line X—X of FIG. 9.

A metal die for forming the lens holder 3 is comprised of a portion 101 for casting the first lens fitting portion 4 and a portion 102 for forming the second lens fitting portion 5, these portions 4, 5 being formed on the same convex die 103, as shown in FIG. 9. The metal die for forming the lens holder 3 is composed of the convex die 103 and a concave die 104 into which is inserted the convex die 103. In this metal die, as the convex die 103 is introduced into the concave die 104, the space defined between the convex die 103 and the concave die 104 serves as a cavity 105 into which the molten resin is introduced. The lens holder 3 is formed by the molten resin being charged into the cavity 105.

The portions 101, 102 for casting the first lens fitting portion 4 and the second lens fitting portion 5, respectively, provided to the convex die 103 used for forming the lens holder 3, are formed by concurrent machining on a lathe, that is by machining by the same chucking operation, so that the coaxial degree is maintained to high accuracy. In case the effective diameter of the objective lens unit is 3 mm and a light beam having a working center wavelength of 405 nm is to be condensed, the first lens fitting portion 4 of the lens holder 3 formed is formed so as to have a high coaxial degree, with an error range less than 30 µm, relative to the second lens fitting portion 5.

The first lens fitting portion 4, provided to the lens holder 3, is formed to have an inner diameter R2 approximately equal to the outer diameter R2 of the outer rim 1*a* of the first lens 1, as shown in FIG. 2. In case the effective diameter of the objective lens is 3 mm and the light beam with a working center wavelength of 405 nm is to be condensed, the inner diameter R1 of the first lens fitting portion 4 is designed to suffer an error less than 30 m with respect to the outer diameter R2 of the outer rim 1*a* of the first lens 1. An inner diameter R3 of the second lens fitting portion 5 is approximately equal to an outer diameter R4 of the outer rim 2*a* of the second lens 2. It is noted that, in case the effective diameter of the objective lens unit is 3 mm and the light beam with a working center wavelength of 405 nm is to be condensed, the inner diameter R3 of the second lens fitting portion 5 is designed to suffer an error less than 30 m with respect to the outer diameter R4 of the outer rim 2*a* of the second lens 2.

Figure 14:
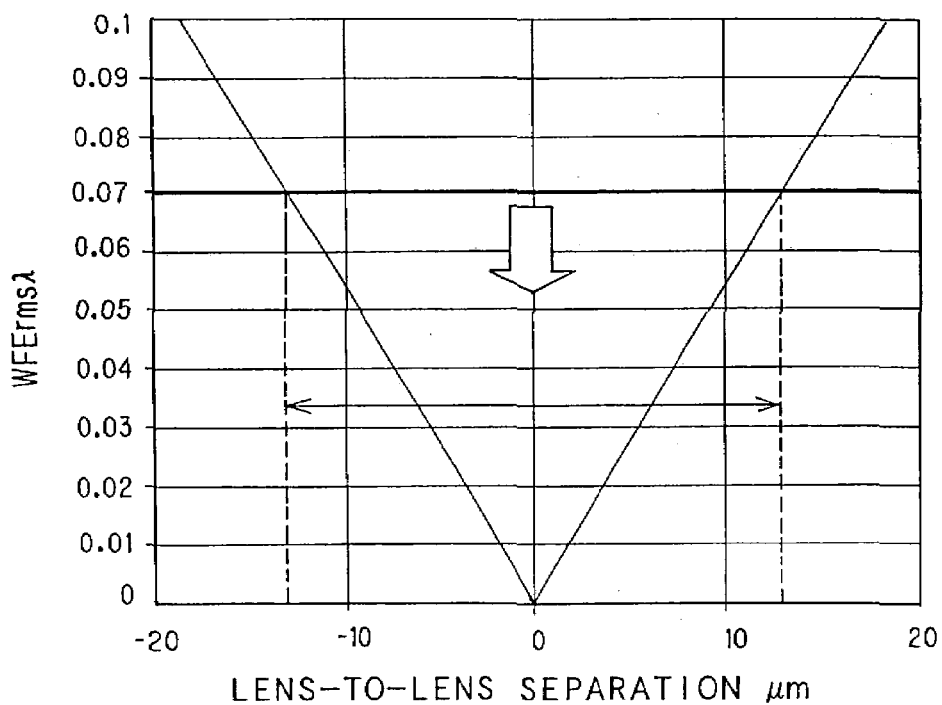
FIG. 14 is a graph showing the distance between the lenses and the value of the wavefront aberration.

If, in the objective lens unit according to the present invention, the parallelism between the two lenses 1 and 2 is deteriorated, the aberration is increased, thus lowering the optical properties, as shown in FIG. 14. If, in an objective lens unit with an effective diameter of 3 mm and with the numerical aperture NA of 0.85, the light beam with a working center wavelength of 405 nm is to be condensed, the RMS value of the aberration exceeds the Marshall criteria threshold (wavefront aberration of 0.07 λrms) in case the parallelism between the first and second lenses 1, 2 exceeds ±0.1 degree.

If, with the outer diameter of the lens of 2 mm, the parallelism between the first and second lenses 1, 2 is to be comprised in a range of ±0.1 degree, it is necessary to support the first and second lenses 1, 2 by the lens holder 3 within an error range of ±3.5 µm in accordance with the following equation:

$$2 \text{ [mm]} \times \tan(\pm 0.1 \text{[deg]}) = \pm 3.5 \text{ µm}.$$

It is extremely difficult to form the lens holder 3, molded using the metal die, and which hold the first and second lenses 1, 2 with the parallelism within the abovementioned error range to high reproducibility. Even if the lens holder 3 capable of holding the first and second lenses 1, 2 with such high accuracy could be formed, it is extremely difficult to put the first and second lenses 1, 2 and the lens holder 3 together without interposition of fine dust and dirt in-between under a working environment of assembling the objective lens unit. As a result, it is extremely difficult to mount the first and second lenses 1, 2 on the lens holder 3 with parallelism within the above-defined error range.

With the objective lens unit of the present invention, unless the distance between the first and second lenses 1, 2, put together as the optical axes $P_1$ of the lenses are coincident and as the parallelism within a preset error range is maintained, is kept within a preset range, the aberration is increased, while the optical characteristics are deteriorated, as shown in FIG. 14. If, with the effective diameter and the numerical aperture of the objective lens unit of 3 mm and 0.85, respectively, and with the light beam to be condensed thereby having a working center wavelength of 405 nm, an error in the distance between the first and second lenses 1, 2 exceeds ±13 µm, the RMS value of the aberration exceeds the limit of the Marshall criteria (wavefront aberration: 0.07 λrms).

It is extremely difficult to form the lens holder 3, capable of holding the first and second lenses 1, 2, forming the objective lens, with the distance therebetween of the above-defined error range, to high reproducibility, using a metal die.

It is extremely difficult to form the lens holder 3, capable of holding the objective lens unit, based solely on the casting accuracy in using a metal die device, as the optical axes $P_1$ of the first and second lenses 1, 2 are registered highly accurately, high degree of parallelism is maintained between the lenses 1, 2, and as the error in the distance between the lenses 1, 2 is maintained to be within a preset range.

With the objective lens unit of the present invention, the precision in the parallelism and the distance between the first and second lenses 1, 2 are guaranteed, using an assembling jig capable of adjusting the assembling accuracy, without being dependent on the precision in casting the lens holder 3.

Figure 15:
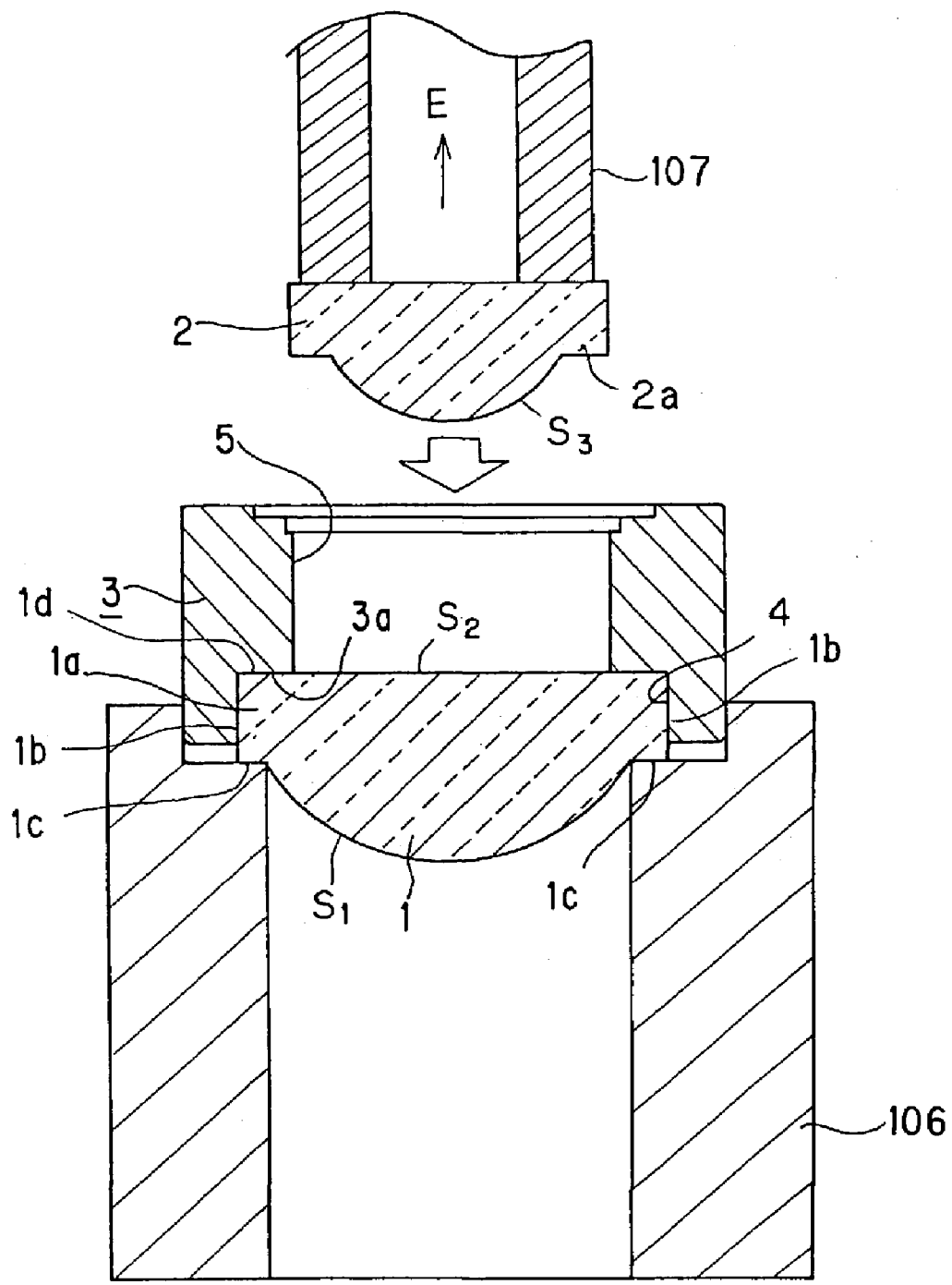
FIG. 15 is a longitudinal cross-sectional view showing the process of assembling the objective lens unit.

That is, in setting the relative positions of the first and second lenses 1, 2 forming the objective lens unit of the present invention, the first lens 1 is inserted into the first lens fitting portion 4 provided within the lens holder 3 and is immobilized using a UV curable resin. At this time, the first lens 1 is introduced into the first lens fitting portion 4 so that its first surface $S_1$ being convex with a large radius of curvature will be protruded from the lens holder 3, as shown in FIGS. 2 and 15. The first surface $S_1$ of the first lens 1 operates as an incident side for the light beam radiated from a light source when the objective lens unit is mounted on an optical pickup device.

The first lens 1, secured to the lens holder 3, is supported on a base block 106 of the jig. At this time, the first lens 1 is carried as its surface 1c towards the first surface of the outer rim 1a is placed on a supporting surface 106a provided on the base block 106 of the jig.

The second lens 2, combined with the first lens 1 to form the objective lens unit of the present invention, is held by a holding jig 107, the relative position of which with respect to the base block 106 supporting the first lens 1 along with the lens holder 3 is maintained to high accuracy. The second lens 2 is introduced into the second lens fitting portion 5 of the lens holder 3, carried by the base block 106, as this holding jig 107 is moved towards the base block 106.

Meanwhile, the holding jig 107 is connected to an air suction device so as to hold the second lens 2 at its distal end by air suction in a direction indicated by arrow E in FIG. 15.

The second lens 2 is introduced into the second lens fitting portion 5 so that the lens surface being convex to a larger radius of curvature faces a second surface $S_2$ of the first lens 1 secured to the lens holder 3.

The convex surface of the second lens 2, facing the second surface $S_2$ of the first lens 1, forms a third surface $S_3$ of the objective lens unit.

The second lens 2, introduced into the second lens fitting portion 5, is positioned, with the first lens 1 secured to the first lens fitting portion 4 of the lens holder 3 as a reference, and is bonded to the lens holder 3, using an adhesive, such as a UV curable resin.

When the first lens 1 is secured to the lens holder 3, the position of the first lens 1 along its optical axis with respect to the lens holder 3 and the tilt of the first lens 1 with respect to the center axis of the lens holder 3 are controlled by an abutting surface 1d towards the second surface $S_2$ of the outer rim 1a compressing against a step 3a provided to the first lens fitting portion 4 formed on the lens holder 3.

An adhesive film with thickness on the order of 10 µm is interposed between the abutting surface 1d of the outer rim 1a of the first lens 1 and the step 3a within the lens holder 3, for securing the first lens 1 to the lens holder 3. As the adhesive, a UV curable resin, curable by illumination by the UV light, is used.

The objective lens unit according to the present invention is used for an optical pickup device adapted for writing or reading out information signals on or from an optical recording medium. When used in an optical pickup device, the objective lens unit of the present invention is arranged so that the first lens 1 and the second lens 2 will be located towards the light source radiating the light beam and towards an optical recording medium 110, respectively, as shown in FIGS. 1 and 2. Since the objective lens unit used in the optical pickup device is used for converging the light beam radiated from the light source on a signal recording surface 111 of the optical recording medium 110, the first and second lenses 1, 2 are combined so that the first surface $S_1$ and the third surface $S_3$, being convex to a larger radius of curvature, will be located towards the light source radiating the light beam.

In the objective lens unit of the present invention, the mounting position of the second lens 2 is set with the mounting position of the first lens 1 as reference. Thus, with the objective lens unit of the present invention, the second lens 2 is positioned with the surface 1c of the outer rim 1a of the first lens 1, on which falls a light beam $L_1$, as a reference surface, as shown in FIG. 2.

The second lens 2, secured to the lens holder 3 with the mounting position of the first lens 1, secured in position to the lens holder 3, as reference, is introduced into and carried by the second lens fitting portion 5 of the lens holder 3 and hence is such a state in which the eccentricity of the first lens 1 relative to the optical axis of the first lens is suppressed, that is in which the offset of the first lens 1 in a planar direction perpendicular to the optical axis is suppressed. When introduced into the second lens fitting portion 5, the second lens 2 is in such a state which, as the eccentricity thereof relative to the optical axis of the first lens 1 is suppressed, enables adjustment of the parallelism of the second lens 2 relative to the first lens 1, that is the tilt and the distance with respect to the optical axis.

Figure 16:
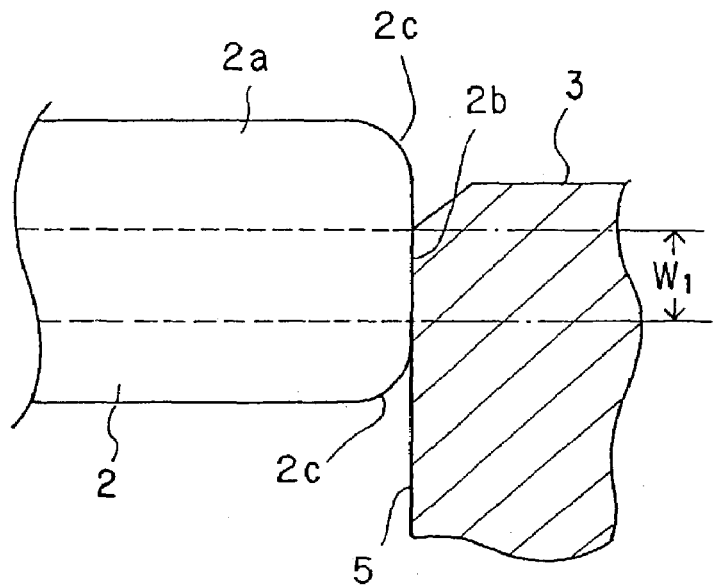
FIG. 16 is a schematic longitudinal cross-sectional view showing the state in which the second lens of the objective lens unit of the present invention has been introduced into the lens holder.

That is, when forming the second lens 2, the metal die is pressured in a direction along the thickness of the second lens 2, that is in a direction parallel to its optical axis. With the second lens 2, formed through this molding process, corner portions 2c, 2c on the outer peripheral side of the outer rim 2a, which the vitreous material reaches last during the casting process, present curved surfaces, whereas the portion in an outer peripheral surface 2b of the outer rim 2a which becomes a cylindrical surface parallel to the optical axis of the second lens 2 is only a portion with a width $W_1$ of approximately 100 μm at a mid portion along the direction of thickness, as shown in FIG. 16. The contact surface of the outer peripheral surface 2b of the outer rim 2a of the so formed second lens 2 with the inner peripheral surface of the second lens fitting portion 5 is only the ring-shaped portion of a width $W_1$ of the order of 100 μm. As a result, the second lens 2, inserted into the second lens fitting portion 5, can be rotated in a direction perpendicular to the optical axis about a ring-like portion of the width $W_1$ of the order of 100 μm, contacted with the inner peripheral surface of the second lens fitting portion 5, as the center of rotation. Additionally, the second lens 2 can be moved in a direction along the optical axis within the second lens fitting portion 5.

When the objective lens of the present invention is used in an optical pickup device for writing or reading out information signals for an optical recording medium, such as an optical disc, it is necessary for the normal operation to be guaranteed in a range of a temperature environment from sub-freezing point to 60° C. or higher. If the temperature environment is changed throughout this range, the air present in the space formed between the first and second lenses 1, 2, inserted into and carried by the lens holder 3, is changed appreciably in density.

The air present in the hermetically sealed space between the first and second lenses 1, 2 is changed appreciably in pneumatic pressure due to changes in the temperature environment. That is, if the temperature rises, the pneumatic pressure between the lenses 1 and 2 is larger than the atmospheric pressure, thus producing the pressure which tends to separate the lenses 1 and 2 away from each other. If conversely the temperature falls, the pneumatic pressure between the lenses 1 and 2 is smaller than the atmospheric pressure, thus producing a pressure which tends to cause the lenses 1 and 2 to approach to each other.

Figure 7:
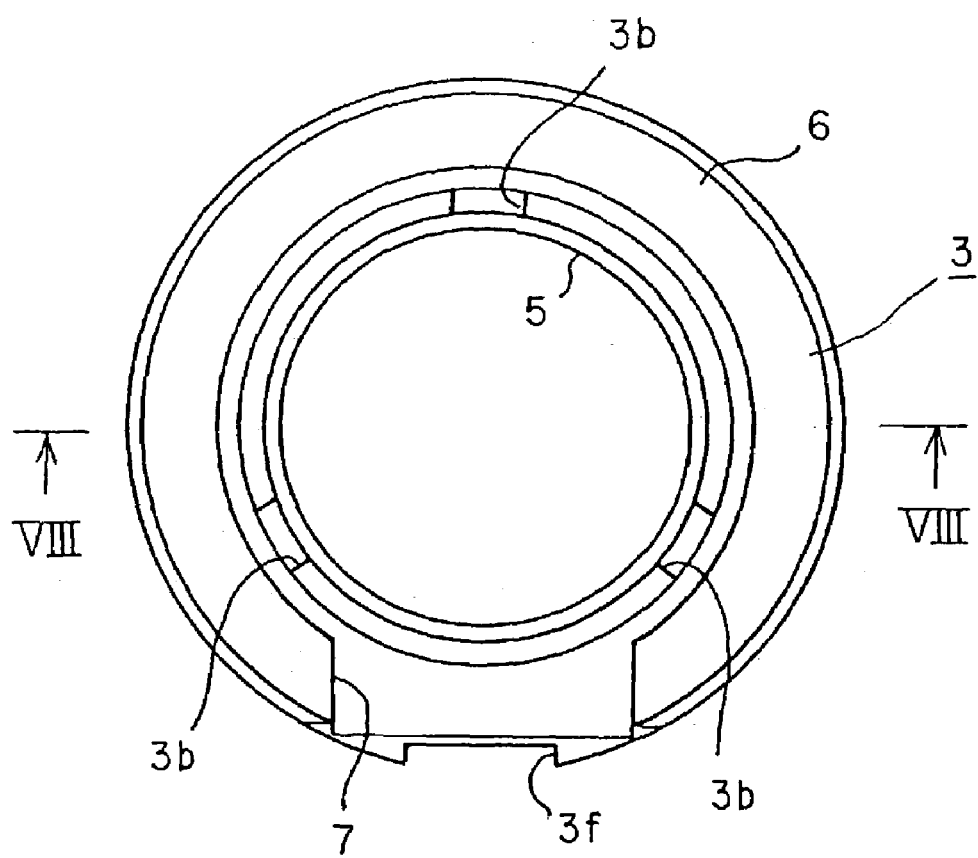
FIG. 7 is a plan view showing a lens holder forming the objective lens unit of the present invention.
Figure 8:
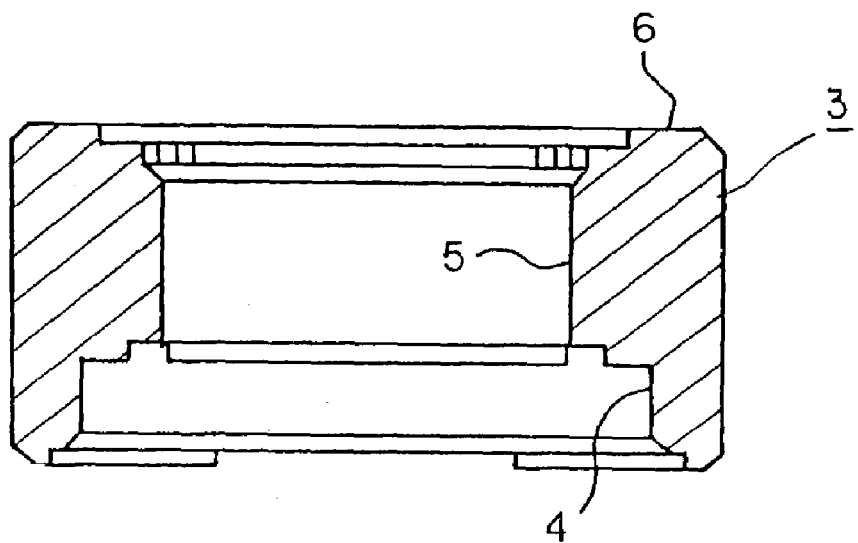
FIG. 8 is a cross-sectional view taken along line VIII—VIII of FIG. 7.

Meanwhile, the first lens 1 has an abutment surface 1d, lying towards the second surface $S_2$ of the outer rim 1a, bonded to the step 3a of the first lens fitting portion 4 with a UV curable resin. The second lens 2, on the other hand, is bonded in position with an adhesive, charged into three recessed adhesive coating portions 3b, formed by cutting out portions of the inner rim of the second lens fitting portion 5, as shown in FIGS. 4 and 7.

Since the first and second lenses 1, 2 are secured to the lens holder 3 with an adhesive, as described above, the adhesive securing the first and second lenses 1, 2 to the lens holder 3, in particular the adhesive securing the second lens 2 to the lens holder 3, is subjected to a stress, due to repeated changes in temperature, representing a so-called heat cycle, thus producing irreversible variations in the distance and tilt of the lens to give rise to deteriorated optical aberration characteristics.

Assuming that the space between the first and second lenses 1, 2, carried by the lens holder 3, is a hermetically sealed space, the air present in the space between the first and second lenses 1, 2 is pressurized, when the second lens 2 is inserted into the lens holder 3 after mounting the first lens 1 on the lens holder 3, with the result that the pressure acting to separate the lenses 1, 2 away from each other is present at all times between the lenses 1 and 2.

Thus, with the objective lens unit of the present invention, an air vent 3c is provided in the lens holder 3, as shown in FIGS. 3 and 5, such that the space between the first and second lenses 1, 2 is a space communicating with an outer side of the lens holder 3. This air vent 3c is formed by forming a recess 3d in a portion of the step 3a, compressing against the abutment surface 1d of the outer rim 1a of the first lens 1, so that the recess 3d is not contacted with the abutment surface 1d of the outer rim 1a, and by forming a cut-out 3e for establishing communication between the recess 3d with the outer peripheral surface of the lens holder 3, as shown in FIG. 5.

By forming the air vent 3c in the lens holder 3, the space between the first and second lenses 1, 2 does not prove a hermetically sealed space, while air in this space is not subjected to changes in the pneumatic pressure, even if the density is changed with changes in temperature, so that no pressure is applied to the lenses 1, 2, and hence no deterioration in optical aberration characteristics is produced despite occurrence of repeated changes in temperature.

Since the space between the first and second lenses 1, 2 does not prove to be a hermetically sealed space, there is no risk of air present in the space between the first and second lenses 1, 2 becoming compressed and pressurized on insertion of the second lens 2 into the lens holder 3 after mounting the first lens 1 to the lens holder 3.

For providing the recess 3d in a portion of the step 3a of the lens holder 3, the portion of the convex die 103 for forming the lens holder 3, which is destined to form the recess 3d, is removed by cutting to produce the step 3a.

On the other hand, a gate G, provided for charging molten resin into a metal die in injection molding the lens holder 3, is provided in a groove 3f formed in the outer peripheral surface of the lens holder 3 in register with a cut-out 3e forming the air vent 3c, as shown in FIG. 5.

Figure 17:
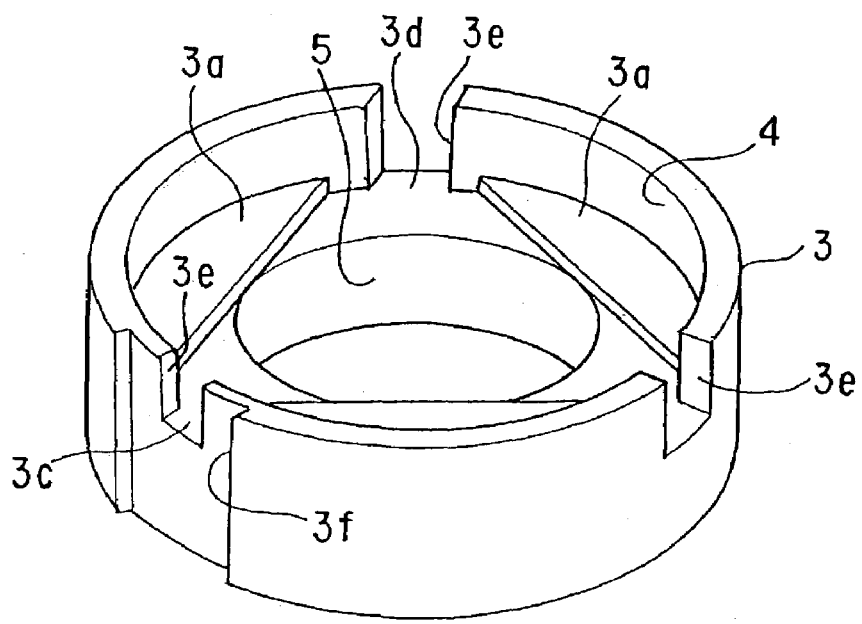
FIG. 17 is a perspective view of a modification of the lens holder forming the objective lens unit, looking from the first lens fitting portion.

The air vent 3c, provided in the lens holder 3, forming the objective lens unit of the present invention, is not limited to a form defined as above, and may be formed by forming three cut-outs 3e extending in three directions from the recess 3d of the step 3a, as shown in FIG. 17.

Figure 18:
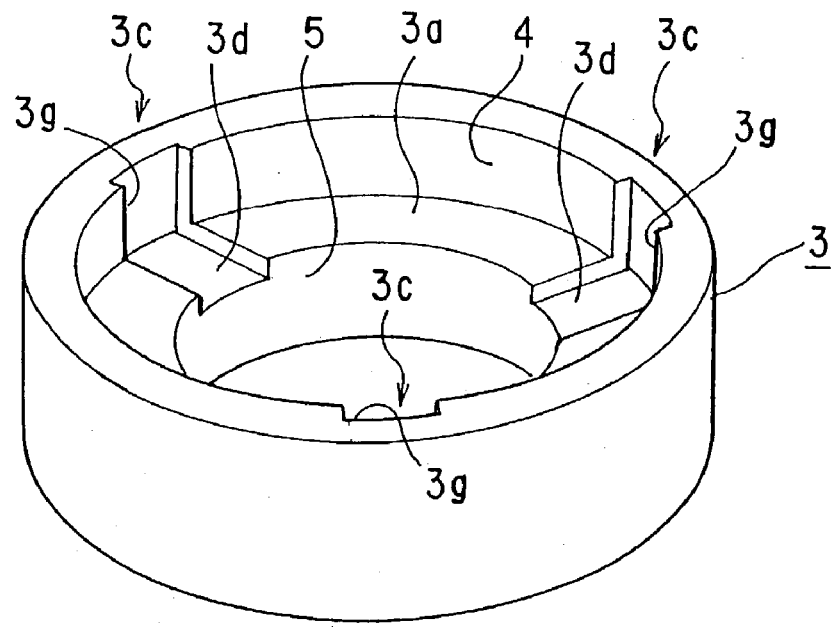
FIG. 18 is a perspective view of a further modification of the lens holder forming the objective lens unit, looking from the first lens fitting portion.

The air vent 3c may also be formed in the lens holder 3 by forming a groove 3g in the first lens fitting portion 4, for providing communication from the recess 3d of the step 3a through this groove 3g and through the lateral side of the first lens 1 to outside, as shown in FIG. 18.

Figure 19:
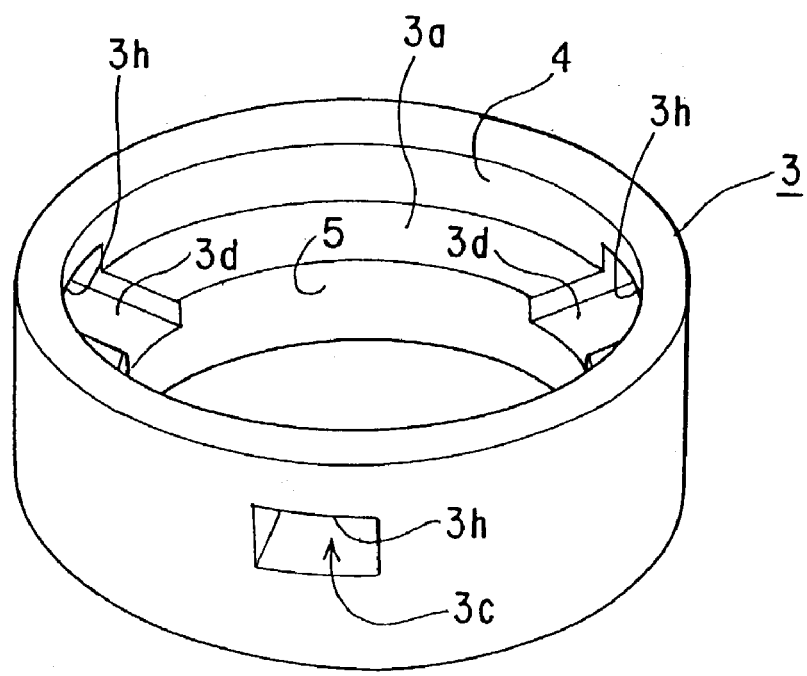
FIG. 19 is a perspective view of a still further modification of the lens holder forming the objective lens unit, looking from the first lens fitting portion.

Alternatively, the air vent 3c may also be formed by forming a through-hole 3h leading from the first lens fitting portion 4 and reaching the outer peripheral surface of the lens holder 3 for providing communication from the recess 3d of the step 3a through this through-hole 3h to outside the lens holder 3, as shown in FIG. 19.

When the objective lens of the present invention is used in an optical pickup device for writing or reading out information signals for an optical recording medium, it is necessary for the normal operation to be guaranteed in a range of a temperature environment from sub-freezing point to 60° C. or higher. If the temperature environment is changed throughout this range, the distance between the first and second lenses 1, 2 is changed due to thermal expansion or contraction of the lens holder 3 itself.

If, with the effective diameter of 3 mm, the working center frequency of 405 nm and the numerical aperture of 0.85, the distance between the first and second lenses 1, 2 is subjected to an error within 13 μm, and the linear expansion coefficient of the material forming the lens holder 3 is α, the following relationship:

$$\alpha \times \Delta t \times L < 13 \times 10^{-3} (\text{mm})$$

is derived.

Here, Δt (temperature change) and L (length of the lens holder) are set as follows:

$$\Delta t = 60/2 = 30 (° C.) \text{ and}$$

$$L = 2 (\text{mm}).$$

From these conditions, the following condition for the linear expansion coefficient α of the material making up the lens holder 3:

$$\alpha < 2 \times 10^{-4}$$

is derived.

Meanwhile, if an epoxy resin, having silica (silicon dioxide) as a filler, is selected as the material forming the lens holder 3, the linear expansion coefficient can be suppressed to a value on the order of $1 \times 10^{-5}$.

The objective lens unit of a double-lens set, made up by two lenses, with the numerical aperture (NA) of not less than 0.7, has a working distance (the physical distance between the surface of the optical recording medium and the end face of the objective lens) smaller than that of a single objective lens used in a conventional optical pickup device. In the optical pickup device, the objective lens position is controlled by focussing servo in such a manner that the distance between the surface of the optical recording medium and the end face of the objective lens will at all times be a preset working distance. The focussing servo, in turn, controls the light beam, converged by the objective lens, so that the light beam, converged by the objective lens, will be focussed on the signal recording surface of the optical recording medium. For example, if disturbances, such as external shock, is applied to the optical pickup device, the objective lens unit may become offset from its design position. If, in this case, the working distance is long, the probability of collision between the optical recording medium and the objective lens unit is low. However, if the working distance is short, the probability of collision between the rim and the objective lens unit becomes higher.

If, when the collision occurs between the optical recording medium and the objective lens unit, the surface of the optical recording medium is directly contacted with the lens surface of the objective lens unit, these surfaces are damaged to deteriorate recording and/or reproducing characteristics.

Figure 20:
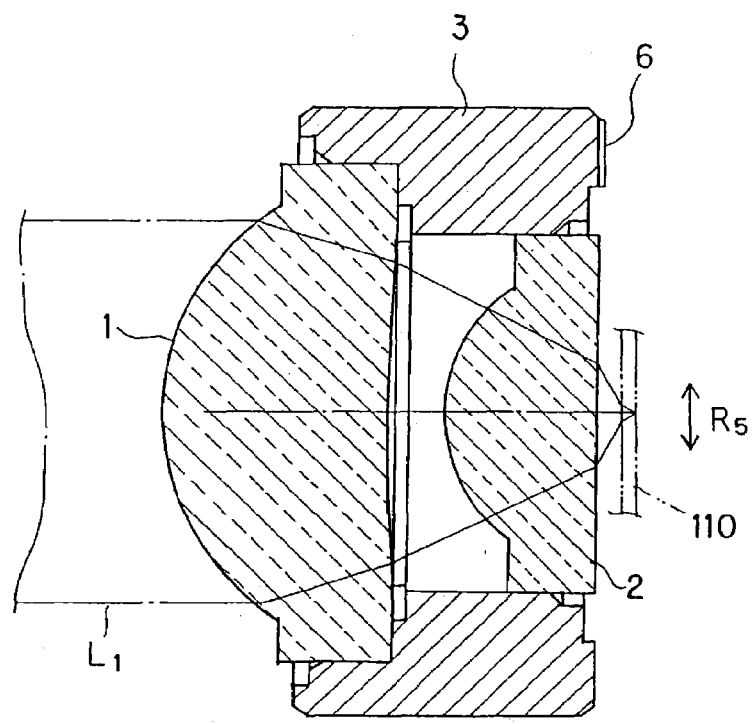
FIG. 20 is a longitudinal cross-sectional view showing an objective lens unit in which a protector is mounted to the lens holder.
Figure 21:
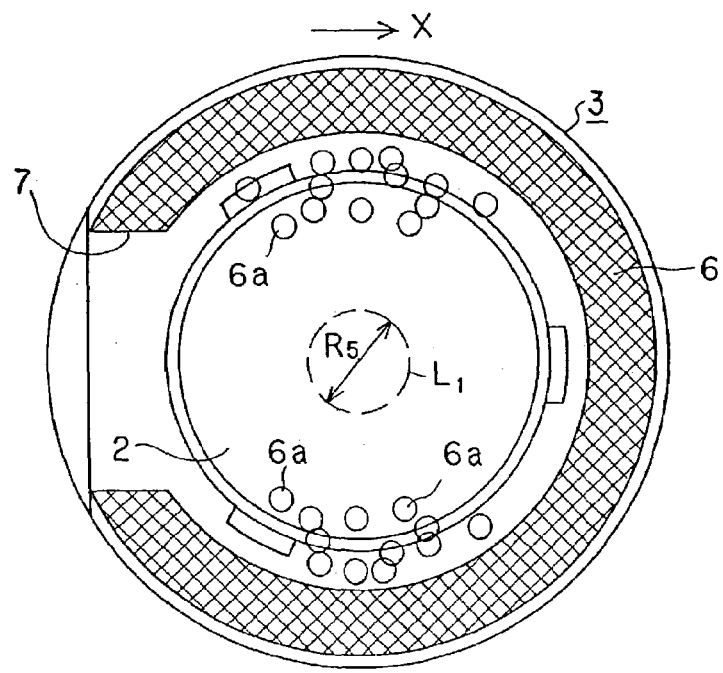
FIG. 21 is a plan view of FIG. 20.

With the objective lens unit of the present invention, a protector 6 is mounted on one end face of the lens holder 3 for encircling the outer periphery of the second lens 2, in order not to damage the lens surface of the optical recording medium or the lens surface of the objective lens unit, as shown in FIGS. 20 and 21. The protector 6 is formed by for example a film of fluorine resin exhibiting elasticity and is provided for being protruded closer to the optical recording medium 110 than the lens surface of the second lens 2 lying closest to the optical recording medium, as shown in FIG. 20. The protector 6 helps prevent direct contact of the surface of the optical recording medium 110 with the lens surface of the objective lens unit, while buffering the force of impact caused by collision between the optical recording medium 110 and the objective lens unit. Moreover, since the protector 6 has an only small frictional coefficient against the surface of the optical recording medium, it is also possible to avoid scorching.

If this protector 6 is provided as described above and should collide against the surface of the optical recording medium 110, the protector 6 operates effectively to prevent the surface of the optical recording medium 110 from being damaged. However, the fluorine resin or the like material, forming the protector 6, is exfoliated. Such debris 6a from the protector 6 becomes accumulated on the lens surface of the second lens 2. If the debris 6a is accumulated within an area of the lens surface of the second lens 2 traversed by the light beam, the light path of the light beam is interrupted to lower the transmission ratio, while affecting optical characteristics, such as optical spatial frequency.

Meanwhile, the debris 6a, produced on exfoliation from the protector 6, is migrated along the direction of relative movement of the optical recording medium 110 with respect to the objective lens unit, that is along the tangential direction of the optical recording medium 110, as indicated by arrow X in FIG. 21.

Thus, in the objective lens unit of the present invention, the protector 6 is formed as one with a cut-out 7 larger in breadth than the diameter $R_5$ of the light beam L1 on the lens surface of the second lens 2, as shown in FIG. 21. In use, this objective lens unit is mounted so that the cut-out 7 is on the path of relative movement of the optical recording medium 110 with respect to the objective lens unit.

Figure 22:
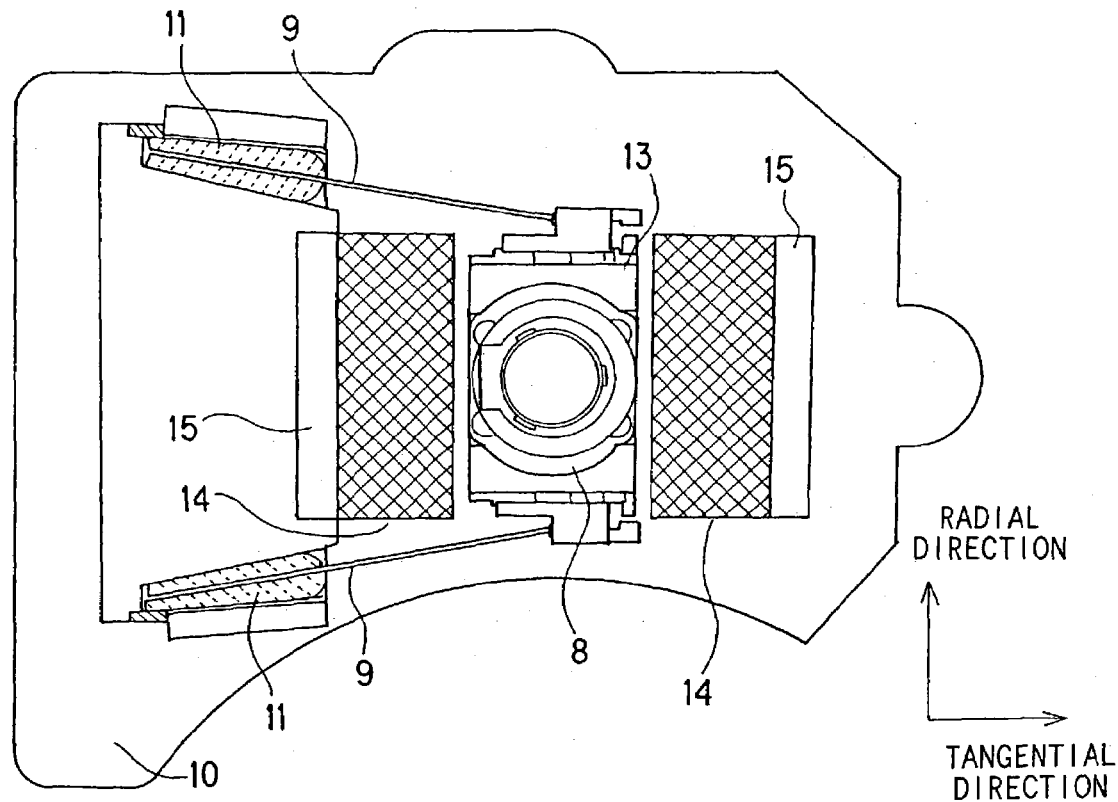
FIG. 22 is a plan view showing an optical pickup device employing the objective lens unit of the present invention.
Figure 23:
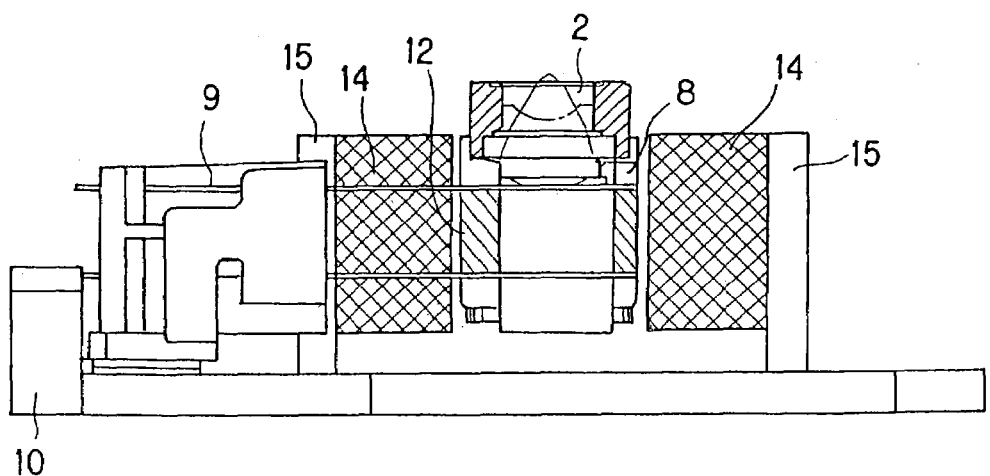
FIG. 23 is a side view of FIG. 22.

The objective lens unit of the present invention is used for an optical pickup device, as is the conventional glass-molded single objective lens, or an objective lens formed of synthetic resin. The objective lens unit of the present invention is loaded on an objective lens driving unit, used in a conventional optical pickup device, as is the conventional objective lens unit, as shown in FIGS. 22 and 23.

As an objective lens driving unit, on which is mounted the objective lens unit according to the present invention, any suitable conventional device may be used. For example, in an objective lens driving unit, having four wires carrying the objective lens unit in a cantilevered fashion, a coil bobbin 8, carrying the objective lens, is mounted for movement relative to a base block 10 by four resilient wires 9, as shown in FIGS. 22 and 23. The proximal sides of these wires 9, carried by the base block 10, are provided with dumpers 11. A focussing coil 12 and a tracking coil 13 are mounted on the coil bobbin 8. A magnet 14 and a yoke 15 are mounted on the base block 10. The magnet 14 and the yoke 15 are mounted for positioning the focussing coil 12 and the tracking coil 13 in the magnetic field thereby generated.

When the driving current is supplied to the focussing coil 12, the objective lens driving unit causes movement of the coil bobbin 8 in the focussing direction parallel to the optical axis of the objective lens unit, under the interaction of the driving current and the magnetic field generated by the magnet 14 and the yoke 15. On the other hand, when the driving current is supplied to the tracking coil 13, the objective lens driving unit causes movement of the coil bobbin 8 in the tracking direction which is the planar direction perpendicular to the optical axis of the objective lens unit, under the interaction of the driving current and the magnetic field generated by the magnet 14 and the yoke 15.

The optical pickup device controls the driving currents supplied to the focussing coil 12 and the tracking coil 13 to move the objective lens unit to control its position so that a light spot of the light beam converged by the objective lens unit will be formed at all times on the signal recording surface of the optical recording medium to follow up with the recording track formed on the optical recording medium.

Meanwhile, if the optical recording medium is an optical disc, the up-and-down direction in FIG. 22 and the direction perpendicular to the drawing sheet of FIG. 23 correspond to the radial direction of the optical disc, while the left-and-right direction in FIGS. 22 and 23 corresponds to the tangential direction of the optical disc.

Figure 24:
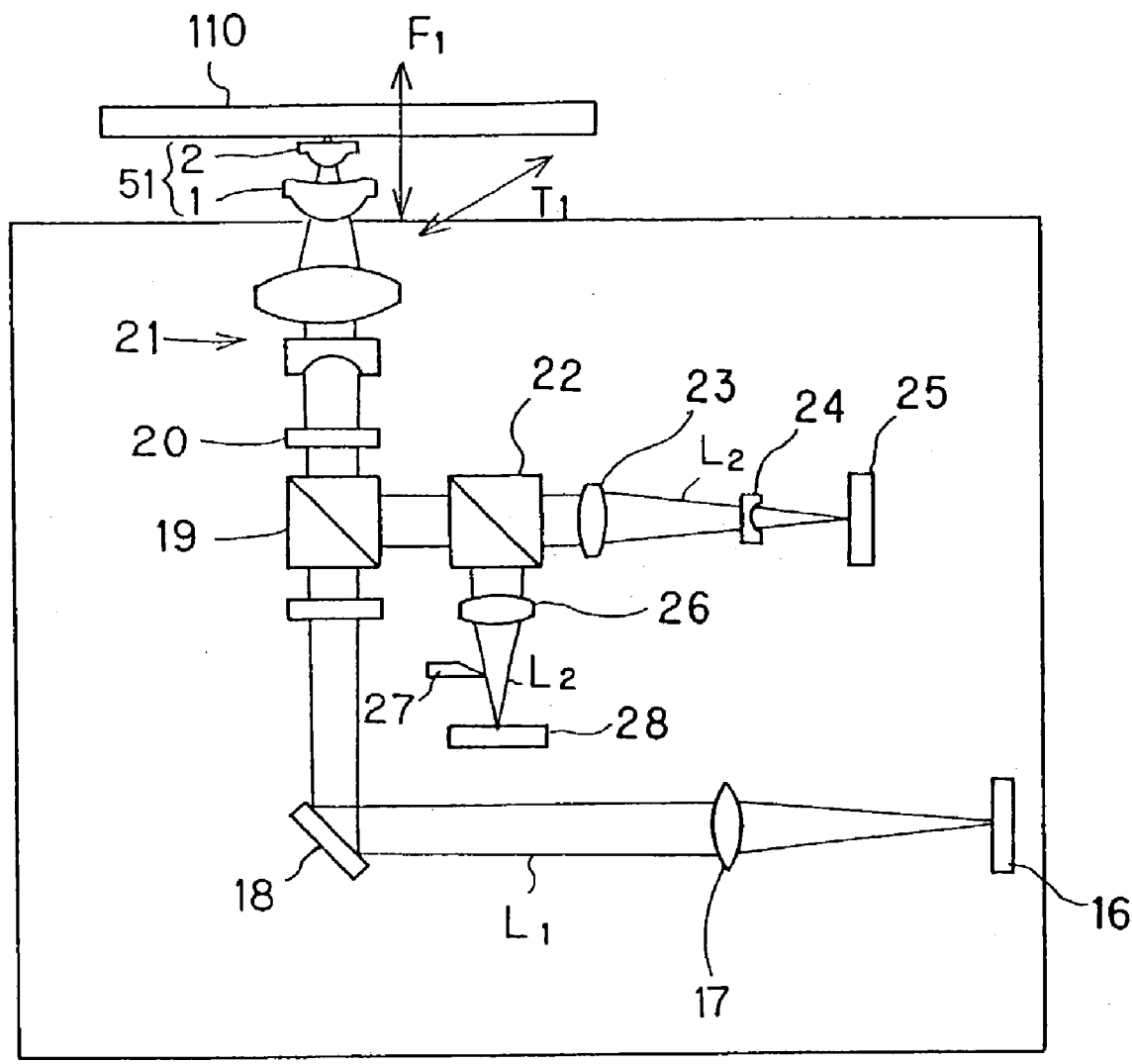
FIG. 24 is a side view showing an optical pickup device and a recording and/or reproducing apparatus employing the objective lens according to the present invention.

The optical pickup device, including the above-described objective lens driving unit and an objective lens unit according to the present invention, includes a semiconductor laser (LD) 16, operating as a light source, as shown in FIG. 24. A linear polarized light beam $L_1$, radiated from a semiconductor laser 16 as divergent light, is collimated by a collimator lens 17, and has its light path bent by 90° by a mirror 18 to fall on a polarization beam splitter (PBS) 19. The light beam, transmitted through the polarization beam splitter 19, is turned into circular polarized light by a λ/4 plate (QWP) 20 to fall on a beam expander 21 formed by a concave lens and a convex lens. The light beam is thereby enlarged in diameter to fall on an objective lens unit 51. This objective lens unit 51 is carried by an objective lens driving unit, not shown, for movement in a focussing direction $F_1$ parallel to the optical axis and in a tracking direction $T_1$ which is the planar direction perpendicular to the optical axis.

The light beam incident on the objective lens is condensed and illuminated by the objective lens 51 on the signal recording surface of the optical recording medium 110, such as an optical disc. The light beam $L_1$, illuminated on the signal recording surface of the optical recording medium 110, is modulated in its direction of polarization, for example, in a preset manner, and is thereby reflected to fall on the objective lens unit 51. This return light beam $L_2$ is transmitted through the beam expander 21 and is converted by the λ/4 plate (QWP) 20 into a linear polarized light beam having the direction of polarization perpendicular to the direction of polarization of the light beam $L_1$ incident on the optical recording medium 110, so as to be returned to the polarization beam splitter 19.

It is noted that the return light beam $L_2$, reflected by the reflecting surface within the beam splitter 19, is incident on a second polarization beam splitter 22. This second polarization beam splitter 22 is set so that the return light beam $L_2$ in a state not modulated by the optical recording medium 110 will be split into the transmitted light and the reflected light, the light volumes of which are equal to each other. The return light beam $L_2$ transmitted through the second polarization beam splitter 22 is condensed via enlarging lens systems 23, 24 on a first photodetector (PD1) 25. The return light beam $L_2$ reflected by the second polarization beam splitter 22 is condensed through a light condensing lens system 26 and a knife edge 27 on a second photodetector (PD2) 28. Based on detection signals of light outputs of these photodetectors 25 and 28, a variety of signals, such as RF signals, focussing error signals or tracking error signals, may be generated to read out information signals recorded on the optical recording medium 110.

As a focussing error signal detection system, the so-called astigmatic method, or the so-called differential concentric method, may be used in place of the aforementioned so-called knife edge method. As a tracking error signal detection system, the so-called push-pull method, the so-called differential push-pull method or the so-called DPD method, may be used. It is noted that this optical pickup device may be used not only for reading out information signals from an optical recording medium 110 but also for writing information signals thereon.

A recording and/or reproducing apparatus may be constructed by providing the optical pickup device, described above, and a recording medium holding mechanism, adapted for holding and rotationally driving the optical recording medium 110, such as an optical disc, as shown in FIG. 24. In the recording and/or reproducing apparatus, shown in FIG. 20, the signals read out by the optical pickup device from the optical recording medium 110 are processed by the signal processing circuit to generate RF signals and various error signals. The signals input to this recording and/or reproducing apparatus from outside are processed by the signal processing circuit so as to be written by the optical pickup device on the optical recording medium 110.

INDUSTRIAL APPLICABILITY

According to the present invention, an objective lens unit comprised for example of a double-lens set, composed of two lenses, with a larger value of the numerical aperture NA not less than 0.7 can be assembled efficiently in a short time by relatively positioning cylindrically-shaped one lens, formed of a synthetic resin material and secured within lens holder, and the other lens, with the one lens as reference for relative positioning. The lens holder needs to be of the necessary minimum degree of precision, thus assuring facilitated manufacture of the lens holder.

Since the separation between the two lenses of the double-lens set, forming the objective lens unit, as well as parallelism between the lenses, may be maintained by the accuracy of the mounting jig, the objective lens unit may be manufactured with optimum reproducibility and improved yield.

The invention claimed is:

1. An objective lens unit comprising:
   a plurality of lenses each having a numerical aperture not less than 0.7, the plurality of lenses including a first lens and at least one secondary lens;
   a cylindrically-shaped lens holder configured to secure the plurality of lenses, wherein
   a position for seating the at least one secondary lens within said lens holder is compensated to correspond to a parallelism characteristic of an outer peripheral surface of the seated first lens;
   a vent formed in a surface of the lens holder, the vent positioned to coincide with a gap area between at least two lenses of the plurality of lenses; and
   a protector provided at an end of the lens holder in the vicinity of the first lens,
   wherein the protector includes a cutout at a position coincident with a path of relative motion of a recording medium the cutout being larger in breadth than a diameter of the light beam of the objective lens unit.

2. A method for the preparation of an objective lens unit, with a numerical aperture not less than 0.7, a plurality of lenses, the plurality of lenses including a first lens and at least one secondary lens, the method comprising the steps of:
- mounting and securing the first lens within a cylindrically-shaped lens holder formed of a synthetic resin material at an end of the lens holder;
- positioning the at least one secondary lens within the lens holder using an outer peripheral surface of the first lens as a reference with respect to a parallelism characteristic of the first lens;
- securing the at least one secondary lens to said lens holder;
- providing a vent in a surface of the lens holder, the vent positioned to coincide with a gap area between at least two lenses of the plurality of lenses; and
- providing a protector at an end of the lens holder in the vicinity of the first lens,
- wherein the protector includes a cutout at a position coincident with a path of relative motion of a recording medium the cutout being larger in breadth than a diameter of the light beam of the objective lens unit.

3. An optical pickup device comprising:
- a light source;
- an objective lens unit configured to condense and illuminate a light beam radiated from said light source to a signal recording surface of an optical recording medium;
- a photodetector configured to detect a return beam of said light beam reflected back from said signal recording surface;
- said objective lens unit including a plurality of lenses including a first lens and at least one secondary lens, and having a numerical aperture not less than 0.7, wherein
- the plurality of lenses are secured within a cylindrically-shaped lens holder, and wherein
- a position for seating the at least one secondary lens within said lens holder is adjusted to correspond to a parallelism characteristic of an outer peripheral surface of the seated first lens;
- a vent formed in a surface of the lens holder, the vent positioned to coincide with a gap area between at least two lenses of the plurality of lenses; and
- a protector provided at an end of the lens holder in the vicinity of the first lens,
- wherein the protector includes a cutout at a position coincident with a path of relative motion of a recording medium the cutout being larger in breadth than a diameter of the light beam of the objective lens unit.

4. A recording and/or reproducing apparatus comprising:
- a recording medium holding unit configured to hold an optical recording medium;
- an optical pickup device including a light source and an objective lens unit configured to condense and illuminate a light beam radiated from said light source to a signal recording surface of said optical recording medium,
- said objective lens unit of said optical pickup device including at least two lenses, the at least two lenses including a first lens and at least one secondary lens, and having a numerical aperture not less than 0.7, wherein
- the at least two lenses are secured within a cylindrically-shaped lens holder,
- a position for seating the at least one secondary lens within said lens holder is adjusted to correspond to a parallelism characteristic of an outer peripheral surface of the seated first lens;
- a vent formed in a surface of the lens holder, the vent positioned to coincide with a gap area between at least two lenses of the plurality of lenses; and
- a protector provided at an end of the lens holder in the vicinity of the first lens,
- wherein the protector includes a cutout at a position coincident with a path of relative motion of a recording medium the cutout being larger in breadth than a diameter of the light beam of the objective lens unit.

5. An objective lens unit including a plurality of lenses including a first lens and at least one secondary lens, and a plurality of lens holders for receiving a respective one of the first lens and at least one secondary lens to secure the plurality of lenses therein, the objective lens unit being constructed by the steps of:
- mounting and securing the first lens within a corresponding lens holder of the plurality of lens holders at an end of the objective lens unit;
- positioning the at least one secondary lens within a further lens holder of the plurality of lens holders of the objective lens unit opposite the first lens to align the at least one secondary lens along an optical axis;
- referencing an outer peripheral surface of the first lens as a reference to compensate the positioning of the at least one secondary lens based on a parallelism characteristic of the first lens;
- securing the at least one secondary lens to the lens holder based on the compensation;
- providing a vent in a surface of the lens holder, the vent positioned to coincide with a gap area between at least two lenses of the plurality of lenses; and
- providing a protector at an end of the lens holder in the vicinity of the first lens,
- wherein the protector includes a cutout at a position coincident with a path of relative motion of a recording medium the cutout being larger in breadth than a diameter of the light beam of the objective lens unit.

* * * * *